No. 774,341. PATENTED NOV. 8, 1904.
F. N. SPELLER.
RECORDING CALORIMETER FOR GAS.
APPLICATION FILED JAN. 30, 1904.
NO MODEL. 2 SHEETS—SHEET 1.
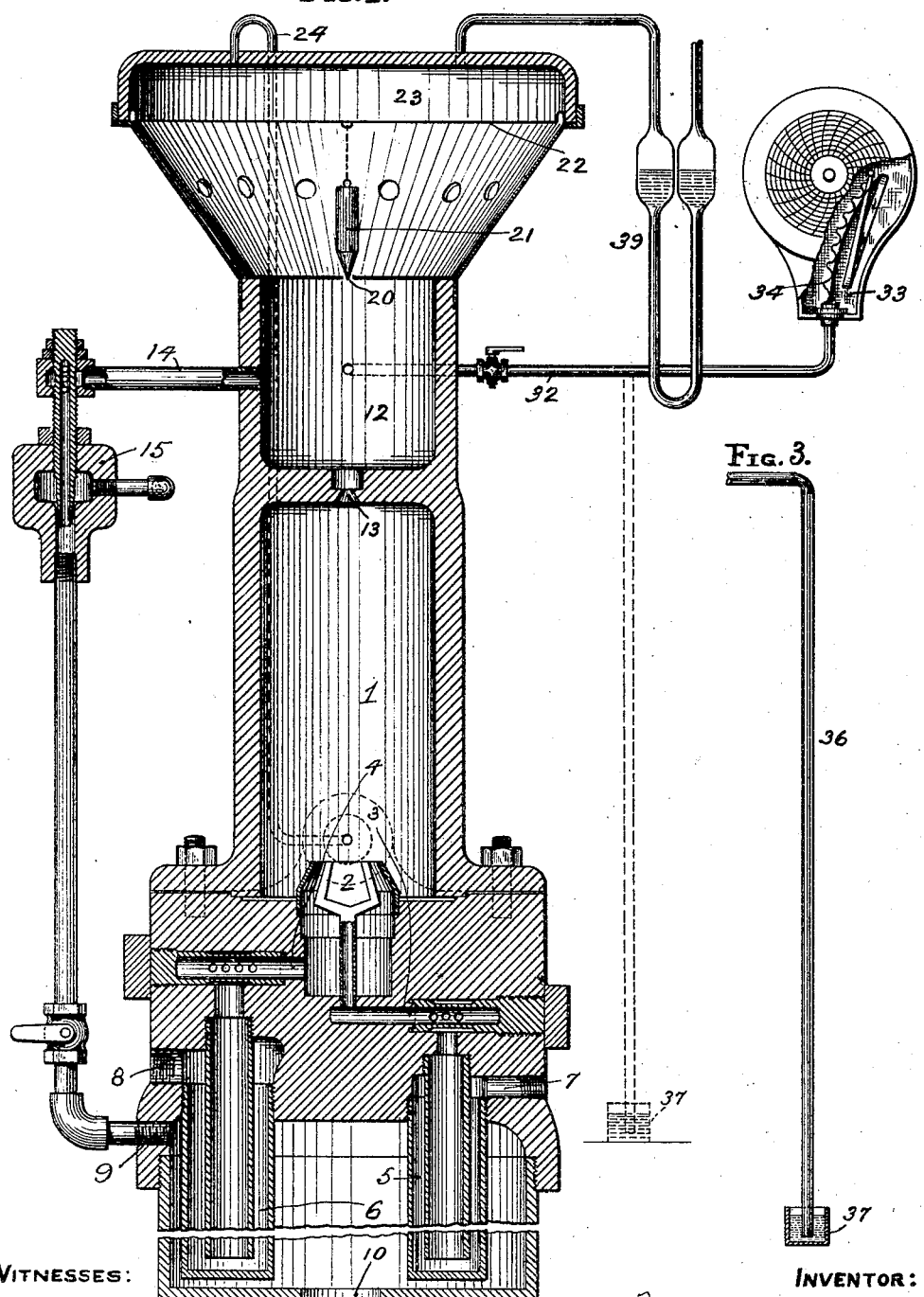

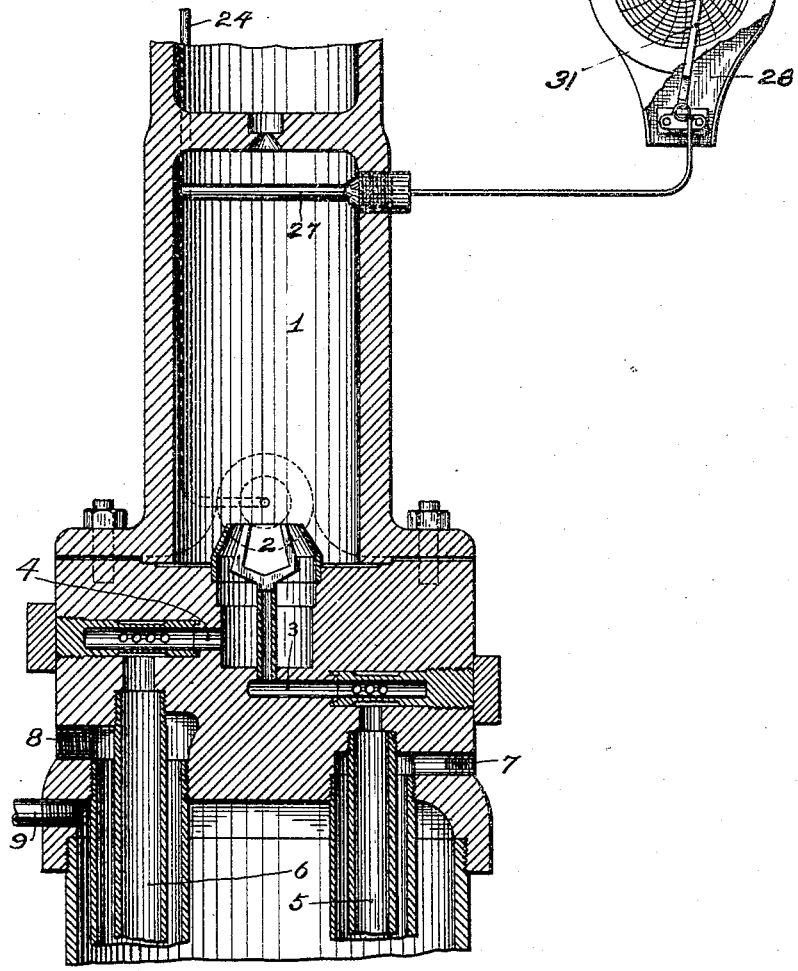

No. 774,341. Patented November 8, 1904.

UNITED STATES PATENT OFFICE.

FRANK N. SPELLER, OF McKEESPORT, PENNSYLVANIA.

RECORDING-CALORIMETER FOR GAS.

SPECIFICATION forming part of Letters Patent No. 774,341, dated November 8, 1904.

Application filed January 30, 1904. Serial No. 191,361. (No model.)

*To all whom it may concern:*

Be it known that I, FRANK N. SPELLER, a resident of McKeesport, in the county of Allegheny and State of Pennsylvania, have invented a new and useful Improvement in Recording-Calorimeters for Gas; and I do hereby declare the following to be a full, clear, and exact description thereof.

My invention relates to calorimeters for gas; and its object is to increase the accuracy of devices of this character and to provide a calorimeter which is continuous in operation and automatically self-recording.

In gas-producing plants and also manufacturing plants where large quantities of gas are used it is customary to test the calorific properties of the gas in order that irregularities or deficiencies therein may be remedied. The present practice of testing the heating power of the gas is to take a known volume of gas measured at a standard temperature and pressure and burn the same with an excess of air. The heat produced thereby is conducted or transferred to a measured quantity of water. From this test the available data is that a known weight of water has been raised in temperature a certain number of degrees by the combustion of a known quantity of gas. From this data the number of calories per cubic foot of gas is easily calculated after making correction for the heat which is absorbed in steam condensed from the products of combustion. With this system evidently only one determination is possible at a time, and as the quality of all manufactured gases varies considerably from time to time an accurate and continuous record of its calorific power is not possible.

The object of my invention is to provide a calorimeter for gas, whereby a continuous record of the heat value of the gas can be obtained, this record being produced automatically.

My invention is based upon the principle that if the gas is burned in a chamber properly insulated to prevent radiation to any considerable extent and that if a constant quantity of gas is burned with a constant quantity of air under constant conditions of temperature and pressure then the only variable will be the temperature produced in the combustion-chamber, and this variable will be directly dependent on and indicative of the variation in the heat value of the gas. In other words, the heat value of the gas will be indicated by the rise and fall in temperature in the combustion-chamber, and as the temperature in the chamber can be continuously measured and recorded the heat value of the gas can be directly read therefrom instead of having to be transferred to water and indirectly read from the temperature of the latter, as under old methods. The reading of the fluctuations in temperature of the combustion-chamber can be obtained by use of any standard form of automatic recording-thermometer or by special mechanical devices, to be hereinafter described, so that thereby a continuous and automatic record of the heating power of the gas is obtained.

In order to make accurate tests under the conditions named, it is essential that a constant quantity of gas be burned at all times, as any variation in the quantity of gas which is burned in the combustion-chamber will produce a variation in the temperature and the latter will not be a correct index of the calorific properties of the gas.

A further object of my invention, therefore, is to provide an arrangement of apparatus whereby a uniform quantity of gas will be burned at all times, so that fluctuations in the recording device will necessarily indicate variations in the heat value of the gas and will not be due in part to variations in the heat properties and in part to variations in the quantity of gas burned.

In the accompanying drawings, Figure 1 is a vertical section through one form of my apparatus. Fig. 2 is a similar section showing a modification, and Fig. 3 is a side view showing a modified form of pressure-indicating device.

In the device illustrated, 1 indicates a combustion-chamber, in the bottom of which is a gas-burner 2. The gas enters through an orifice 3 of fixed size, and the air through an orifice 4 also of fixed size. Both the air and gas must be measured at a constant temperature, and hence are preferably heated to about 212° Fahrenheit prior to their introduction into the combustion-chamber. The heating of the air and gas may be accomplished in any suitable way, such as circulating the same through chambers 5 and 6, respectively, which are heated externally by any suitable means, such as by the circulation of condensing steam at atmospheric pressure. The gas enters chamber 5 through an inlet 7 and the air enters chamber 6 through an inlet 8, and the chambers 5 and 6 are so constructed that a circuitous path is provided for the air and gas, so as to thoroughly heat the same. These chambers are shown as heated by means of steam entering through an orifice 9 and condensing at atmospheric pressure by reason of the opening 10 in the steam-chamber.

The gas is burned with a fixed proportion of air, and preferably a large excess of air. For instance, nine to one is used to insure a complete combustion of the gas and to reduce to a negligible quantity any possible error in measurement of the calorific properties of the gas due to variations in the average specific gravity and specific heat of the gases produced by the combustion. The air and gas will be burned in the chamber 1 in the usual way, and the products of combustion will be heated proportionately to the heat generated. Hence by measuring the temperature of the products of combustion under these conditions and calibrating the thermometer used in B. T. U's. by experiment with a gas of similar composition and of known heating power the calorific power of the particular gas being burned may be found. By connecting a recording-theremometer of any known type to the upper portion of the combustion-chamber a continuous record of the calorific properties of the gas may be obtained.

In order to be certain that the fluctuations in the recorded temperature are due to variations in the calorific properties of the gas rather than to variations in quantity of gas burned, it is necessary to insure the burning of uniform quantities of gases at all times. It will be readily understood that if the calorific power of the gas increases very sharply it will create a greater degree of heat in the combustion-chamber 1, this unduly expanding the gases therein and increasing the pressure in said chamber. This increase of pressure will have a tendency to retard the inflow of gases, so that there is liability of a smaller quantity of gas entering the chamber in the next few moments, which naturally will produce a decrease of temperature in the chamber. This decrease of temperature would be measured by the recording-thermometer, but would not be any indication of a decrease in the calorific power of the gas. Hence it is necessary to secure a constant flow of gas into the combustion-chamber. To do this, a constant difference of pressure must be maintained between the gas and air supply and the combustion-chamber, so that the quantity of gas used depends proportionately on the size of the orifice 3. One essential feature of my invention has to do with insuring the burning of uniform quantities of gas in the chamber 1, and this is done by providing means for maintaining a constant pressure or suction in said chamber. Accordingly I connect to said chamber some form of suction device which will maintain a pressure in the chamber lower than atmospheric pressure, and also provide means for regulating this suction, so that a constant difference of pressure between the combustion-chamber and atmosphere outside will be maintained independent of fluctuations in temperature in combustion-chamber.

A large variety of suction devices may be used. As shown in the drawings, I provide above the combustion-chamber 1 a pressure-chamber 12, connected to the chamber 1 by an orifice 13. Connected to the chamber 12 is a pipe 14, which is connected to an ordinary steam or similar injector 15, whereby suction may be produced in the chamber 12, and this will be communicated to the chamber 1. The steam used for the injector 15 may be used to heat the air and gas chambers 5 and 6 by connecting the same by means of a pipe to said chambers, and is so shown in Fig. 1. In order to regulate this suction apparatus to maintain a constant pressure in the chamber 1, I provide an orifice 20 in said chamber 12, which communicates with the air and the walls of which form a valve-seat. A regulating-valve plug 21 is suspended over this orifice, this valve-plug being connected to a diaphragm 22, forming one wall of a chamber 23. This chamber is connected by means of a pipe 24 to the combustion-chamber 1, so that any variation in the pressure in the combustion-chamber will be communicated to the chamber 23, and through the diaphragm 22 will control the regulating-valve 21. It will be readily understood that if the pressure in the chamber 1 increases by reason of its expansion, due to increased calorific properties of the gas being burned, such increased pressure will be communicated through the pipe 24 to the suction-regulating chamber 23, thus depressing the diaphragm 22 and causing the valve-plug 21 to partially close the orifice 20. Less air can therefore enter the chamber 12, and this decrease of air entering at 20 will cause an increase of gases coming from the chamber 1, thus lowering the pressure in the combustion-chamber to what it was prior to the increase of temperature and keeping the pressure in the chamber 1 uniform. If the calorific property of the gas should decrease, this would cause a decrease of pressure in the chamber 1, due to a less expansion of the gases therein. This decrease of pressure likewise would be communicated to the chamber 23, thus causing an upward movement of the diaphragm 22 and valve-plug 21 and permitting a larger amount of air to enter through the orifice 20. As a consequence a lesser amount of gases would be drawn by the suction apparatus from the chamber 1. In this way a substantially uniform pressure can be maintained at all times in the combustion-chamber 1, and as a consequence a uniform quantity of gas will always flow to the burner 2. The constant pressure in chamber 1 is determined by the weight of diaphragm 22 and valve-plug 21. By making the diaphragm nine or ten inches in diameter no perceptible fluctuation in pressure in the combustion-chamber can be seen.

The temperature of the burning gases will be measured in such a way as to give a continuous indication or record thereof, and this forms another essential feature of my invention. This continuous record may be obtained by the use of an ordinary Bristol thermometer 27, projecting into the combustion-chamber 1 and connected to a Bristol recording-thermometer 28 of well-known type. This thermometer, as is well known, comprises a tube filled or partially filled with alcohol or other highly-volatile liquid, connected, by means of a tube, to the recorder, the latter being, in effect, a pressure-recorder having a coil which will tend to straighten under increasing pressures of the liquid, or gases of the liquid, and thus move the indicating or recording pointer 31 in the well-known manner.

Another way of measuring the temperature is to connect the pressure-chamber 12, by means of a pipe 32, to an ordinary Bristol vacuum-recorder 33. This recorder, as is well known, comprises a flexible bent or serpentine tube 34, which will tend to change its position by reason of suction exerted thereon, and thus move an indicating or recording hand over a dial in the well-understood mander. In place of the Bristol vacuum-recorder I may use an ordinary manometer 36, this being merely a glass or similar tube connected at its upper end to the suction-chamber 12 and having its lower end open and projecting into a vessel 37 containing water or other liquid, the height of the column of liquid in said tube indicating the degree of pressure or suction in the chamber 12.

In the case of the Bristol vacuum-recorder and the manometer the recording of the temperature is effected indirectly by the pressure or suction in the chamber 12 rather than directly by the heat, as is the case with the thermometer. As the suction, however, in the chamber 12 will be proportional to the expansion of the products of combustion in the chamber 1 and as this expansion is directly proportional to the temperature in the chamber 1, it will be seen that by measuring the suction in the chamber 12 we obtain a correct record of the temperature in the chamber 1.

An ordinary gage 39, of well-known type, is connected to the suction-regulating chamber 23 to indicate the degree of suction therein.

The operation of my device is as follows: The gas previous to entering the combustion-chamber 1 will be cleaned, if necessary, and passed through any form of pressure-regulating device set so that the outflowing gas is under a slight pressure—about one-half inch above atmospheric pressure. The gas will be lighted at the burner 2 and will be burned in the chamber 1, together with a large quantity or proportion of air. The suction device will draw the products of combustion through the orifice 13 and into the chamber 12 and thence out. Any increase of pressure in the chamber 1 due to increased calorific properties of the gas will at once be communicated to the chamber 23, thus moving valve-plug 21 and decreasing the size of the orifice 20. As a consequence a larger quantity of gas will be drawn out of chamber 1, thus maintaining the pressure in said chamber practically constant. Upon a decrease of the calorific properties of the gas pressure in the chamber 1 will decrease, and this will immediately be communicated to the chamber 23, thus raising the diaphragm and valve-plug 21 and increasing the size of the orifice 20. As a consequence, a lesser quantity of gas will be drawn from the chamber 1. In this manner a uniform difference of pressure will be maintained between atmospheric pressure and the chamber 1 entirely independent of variations in calorific properties of the gas, and as the size of the orifice 3 is fixed this will insure that uniform quantities of the gas will flow into the said chamber at all times. Any variation in the temperature in the chamber 1, therefore, will be due to variations in the calorific property of the gas alone and will not be due in part to the variations in the quantity of gas burned. Atmospheric pressure is the basis of measuring pressure in the apparatus, and the fact that this standard of pressure always varies slightly does not affect the accuracy of the results, as all other constants vary proportionally. The temperature in the chamber 1 will be measured either directly by the pyrometer (shown in Fig. 3) or indirectly by indicating or recording the pressure or suction in the chamber 12. With increase of temperature in the chamber 1 the orifice 20 will be proportionally decreased in size, thus creating a proportionally stronger suction in chamber 12, which will be communicated to the vacuum indicator or recorder, whereas a decrease in the temperature in chamber 1 will result in increasing the size of the orifice 20, permitting a larger quantity of air to flow in and proportionally decreasing the intensity of the suction in chamber 12, which decrease will be indicated by the recorder.

It will thus be seen that my device provides for the continuous recording of the calorific properties of the gas and also secures the burning of uniform quantities of gas at all times. The temperature of the combustion-chamber being always above 212° Fahrenheit prevents condensation of steam from the products of combustion, and hence no correction for this need be made. The details of the arrangement of the apparatus may be considerably varied without departing from the essential features of my invention as above indicated.

What I claim is—

1. In a device for measuring the heating value of gases, the combination of a combustion-chamber, gas and air inlets thereto, means for maintaining constant pressure in said combustion-chamber at all temperatures therein, and means for measuring the temperature in said chamber.

2. In a device for measuring the heating value of gases, the combination of a combustion-chamber, gas and air inlets thereto, suction means for maintaining constant pressure in said chamber at all temperatures therein, and a continuously-acting device for indicating the heat of said chamber.

3. In a device for measuring the heating value of gases, the combination of a combustion-chamber, gas and air inlets thereto, means for maintaining a constant pressure in said chamber, and a measuring device controlled by the pressure-maintaining means.

4. In a device for measuring the heating value of gases, the combination of a combustion-chamber, air and gas measuring inlets thereto, means for heating the air and gas, and a continuously-acting heat-indicating device connected to said chamber.

5. In a device for measuring the heating value of gases, the combination of a combustion-chamber, means for measuring air and gas at a uniform temperature and introducing the same into said chamber, means for maintaining a constant pressure in said chamber, and means for measuring the temperature in said chamber.

6. In a device for measuring the heating value of gases, the combination of a combustion-chamber, gas and air inlets thereto, a suction device connected to said chamber, a regulating-valve for said suction device controlled by the pressure in said chamber, and means for measuring the temperature in said chamber.

7. In a device for measuring the heating value of gases, the combination of a combustion-chamber, gas and air inlets thereto, a suction device connected to said chamber, a regulating-valve for said suction device controlled by the pressure in said chamber, and a measuring device controlled by said suction device.

8. In a device for measuring the heating value of gases, the combination of a combustion-chamber, gas and air inlets to said chamber, a suction-chamber connected to said combustion-chamber, a regulating-valve for said suction-chamber controlled by the pressure in the combustion-chamber, and means for measuring the heat in said combustion-chamber.

9. In a device for measuring the heating value of gases, the combination of a combustion-chamber, gas and air inlets thereto, a suction-chamber connected to said combustion-chamber, a regulating-valve for said suction-chamber controlled by the pressure in the combustion-chamber, and a pressure or suction indicating device connected to said suction-chamber.

10. In a device for measuring the heating value of gases, the combination of a combustion-chamber, gas and air inlets thereto, a suction-chamber connected to said combustion-chamber, a regulating-valve for said suction-chamber controlled by the pressure in the combustion-chamber, and a vacuum-recorder connected to said suction-chamber.

11. In a device for measuring the heating value of gases, the combination of a combustion-chamber, gas and air inlets thereto, a suction device connected to said combustion-chamber, an air-orifice in said suction apparatus, a regulating-valve thereto controlled by the pressure in the combustion-chamber, and means for measuring the temperature in said combustion-chamber.

12. In a device for measuring the heating value of gases, the combination of a combustion-chamber, gas and air inlets thereto, a suction device connected to said combustion-chamber, a regulating-valve for said suction device, a suction-regulating chamber connected to the combustion-chamber, a diaphragm forming one wall of said suction-regulating chamber, connections between said diaphragm and said regulating-valve, and means for measuring the heat in the combustion-chamber.

13. In a device for measuring the heating value of gases, the combination of a combustion-chamber, gas and air inlets thereto, a suction device connected to said combustion-chamber, a regulating-valve for said suction device, a suction-regulating chamber connected to the combustion-chamber, a diaphragm forming one wall of said suction-regulating chamber, connections between said diaphragm and said regulating-valve, and a suction-indicating device controlled by said suction apparatus.

14. In a device for measuring the heating value of gases, the combination of a combustion-chamber, gas and air inlets thereto, a suction-chamber connected to said combustion-chamber and provided with an orifice, a valve-plug for regulating the size of said orifice, a suction-regulating chamber connected to the combustion-chamber, a diaphragm forming one wall of said suction-regulating chamber, connections between said diaphragm and said regulating-valve, and means for measuring the temperature in said combustion-chamber.

In testimony whereof I, the said FRANK N. SPELLER, have hereunto set my hand.

FRANK N. SPELLER.

Witnesses:
 HARRISON PRINDLE,
 G. M. GOODSPACE.